US010974783B2

(12) United States Patent
Lehrbaum et al.

(10) Patent No.: US 10,974,783 B2
(45) Date of Patent: Apr. 13, 2021

(54) EXHAUST SHIELD ASSEMBLY

(71) Applicant: Harley-Davidson Motor Company Group, LLC, Milwaukee, WI (US)

(72) Inventors: Daniel Lehrbaum, Waukesha, WI (US); Scott Nash, Muskego, WI (US); David M. Pittman, Sussex, WI (US); Michael Welliver, St. Francis, WI (US); Gary Zinser, Davenport, IA (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 313 days.

(21) Appl. No.: 16/104,652

(22) Filed: Aug. 17, 2018

(65) Prior Publication Data

US 2020/0055560 A1    Feb. 20, 2020

(51) Int. Cl.
*B62J 23/00*     (2006.01)
*F01N 13/14*    (2010.01)
*F01N 13/18*    (2010.01)
*B60R 13/08*    (2006.01)

(52) U.S. Cl.
CPC .......... *B62J 23/00* (2013.01); *B60R 13/0876* (2013.01); *F01N 13/14* (2013.01); *F01N 13/1855* (2013.01); *B60R 2013/0807* (2013.01)

(58) Field of Classification Search
CPC .................. B62J 23/00; B60R 13/0876; B60R 2013/0807; F01N 13/14; F01N 13/1855
USPC .................................................. 60/320–323
See application file for complete search history.

(56) References Cited

U.S. PATENT DOCUMENTS

| | | | |
|---|---|---|---|
| 3,178,208 A | | 4/1965 | Koehler |
| 3,237,716 A | * | 3/1966 | Parsons .................... F01N 13/14 |
| | | | 181/243 |
| 3,443,911 A | | 5/1969 | Keith et al. |
| 3,495,673 A | * | 2/1970 | Yazejian ................. B60R 13/00 |
| | | | 180/89.2 |
| 3,675,398 A | | 7/1972 | Giarrizzo |
| 3,677,365 A | * | 7/1972 | Wright ..................... F01N 13/14 |
| | | | 181/243 |
| 3,709,772 A | * | 1/1973 | Rice ......................... F01N 13/14 |
| | | | 60/282 |
| 3,863,445 A | * | 2/1975 | Heath ...................... F01N 13/14 |
| | | | 60/320 |
| 3,946,764 A | * | 3/1976 | Hubbell, III ............ F01N 13/14 |
| | | | 138/148 |
| 4,085,816 A | * | 4/1978 | Amagai ................... F01N 13/14 |
| | | | 248/62 |

(Continued)

FOREIGN PATENT DOCUMENTS

| | | | | |
|---|---|---|---|---|
| DE | 4107539 A1 | * | 9/1992 | ............. F01N 13/14 |
| DE | 4142360 A1 | * | 6/1993 | ............. F01N 13/14 |

(Continued)

*Primary Examiner* — Thai Ba Trieu
(74) *Attorney, Agent, or Firm* — Michael Best & Friedrich LLP

(57) ABSTRACT

An exhaust assembly for a vehicle. The exhaust assembly includes a header assembly including one or more head pipes, and a bridge with a first end and a second end that is opposite the first end. The first and second ends are secured to the header assembly. The exhaust assembly further includes a shield assembly including a shield shaped to cover a portion of the header assembly and a retainer secured to the shield and supported by the bridge by a planar clamp joint therebetween.

23 Claims, 7 Drawing Sheets

(56) References Cited

U.S. PATENT DOCUMENTS

| | | | |
|---|---|---|---|
| 4,328,188 A | 5/1982 | Kawata | |
| 4,426,844 A | 1/1984 | Nakano | |
| 4,478,310 A * | 10/1984 | Harter | F01N 13/14 60/299 |
| 4,522,282 A | 6/1985 | Yamamoto | |
| 4,612,767 A * | 9/1986 | Engquist | F01N 13/14 60/323 |
| 4,619,292 A * | 10/1986 | Harwood | F01N 13/14 60/320 |
| 4,730,852 A | 3/1988 | Arscott | |
| 5,036,947 A | 8/1991 | Metzger | |
| 5,228,726 A | 7/1993 | Brown et al. | |
| 5,372,530 A | 12/1994 | Holtermann et al. | |
| 5,402,830 A * | 4/1995 | Dortzbach | F16L 9/18 138/110 |
| 5,408,827 A | 4/1995 | Holtermann et al. | |
| 5,568,726 A | 10/1996 | Yamada et al. | |
| 5,588,680 A | 12/1996 | Cassel et al. | |
| 5,589,144 A * | 12/1996 | Filippi | F01N 13/14 228/176 |
| 5,775,100 A | 7/1998 | Sloss et al. | |
| 5,966,933 A | 10/1999 | Ishihara et al. | |
| 6,026,930 A | 2/2000 | Ogisu et al. | |
| 6,109,026 A | 8/2000 | Karlsson et al. | |
| 6,131,252 A | 10/2000 | Hoheisel et al. | |
| 6,161,379 A * | 12/2000 | Haselkorn | F01N 13/14 60/323 |
| 6,334,501 B1 | 1/2002 | Kawamoto | |
| 6,438,949 B1 | 8/2002 | Naoki | |
| RE37,848 E | 9/2002 | Nanami et al. | |
| 6,530,443 B1 * | 3/2003 | Tsuruta | F01N 13/14 180/89.2 |
| 6,688,929 B2 | 2/2004 | Lecours et al. | |
| 7,178,498 B2 | 2/2007 | Takeuchi | |
| 7,263,827 B2 * | 9/2007 | Oshima | F01N 13/14 60/322 |
| 7,347,045 B2 | 3/2008 | Bozmoski et al. | |
| 7,401,463 B2 | 7/2008 | Tsuruta | |
| 7,413,716 B2 | 8/2008 | Mavinahally et al. | |
| 7,490,465 B2 | 2/2009 | Weimert et al. | |
| 7,490,871 B2 | 2/2009 | Avram et al. | |
| 7,568,548 B2 | 8/2009 | Fujii et al. | |
| 7,731,241 B2 | 6/2010 | Aoki et al. | |
| 7,770,690 B2 | 8/2010 | Schorn et al. | |
| 7,819,222 B2 | 10/2010 | Baum et al. | |
| 7,882,700 B2 | 2/2011 | Yamakura et al. | |
| 7,895,832 B2 | 3/2011 | Gruber | |
| 7,941,995 B2 | 5/2011 | Goss et al. | |
| 8,091,349 B2 | 1/2012 | Sakurai et al. | |
| 8,136,352 B2 | 3/2012 | Arai | |
| 8,215,447 B1 | 7/2012 | Orihashi et al. | |
| 8,220,587 B2 | 7/2012 | Mori et al. | |
| 8,291,698 B2 | 10/2012 | Hikami | |
| 8,322,479 B2 | 12/2012 | Tani et al. | |
| 8,341,953 B2 * | 1/2013 | Murakami | F01N 13/1872 60/323 |
| 8,359,846 B2 * | 1/2013 | Murakami | F01N 13/1872 60/323 |
| 8,524,161 B2 * | 9/2013 | Kumar | F01N 3/0211 422/179 |
| 9,016,427 B2 * | 4/2015 | Yazaki | B60R 13/0876 180/309 |
| 9,309,798 B2 | 4/2016 | Smith et al. | |
| 9,499,226 B2 | 11/2016 | Senda | |
| 9,573,459 B2 | 2/2017 | Shimomura | |
| 2004/0045756 A1 | 3/2004 | Martin | |
| 2004/0075276 A1 | 4/2004 | Lemke et al. | |
| 2004/0178632 A1 * | 9/2004 | Protas | F16L 21/065 285/419 |
| 2005/0189768 A1 * | 9/2005 | Avram | F16L 21/065 285/419 |
| 2006/0175837 A1 * | 8/2006 | Ignaczak | F16L 21/065 285/420 |
| 2007/0220872 A1 | 9/2007 | Weimert et al. | |
| 2008/0081145 A1 * | 4/2008 | Schweiggart | B60R 13/0876 428/68 |
| 2008/0098721 A1 | 5/2008 | Liu | |
| 2009/0000287 A1 | 1/2009 | Blaisdell et al. | |
| 2009/0072535 A1 | 3/2009 | Baumann et al. | |
| 2009/0079189 A1 * | 3/2009 | Cassel | F16L 21/065 285/420 |
| 2009/0189392 A1 * | 7/2009 | Ignaczak | F16L 21/065 285/420 |
| 2011/0023471 A1 | 2/2011 | Werni et al. | |
| 2011/0272941 A1 | 11/2011 | Broderick et al. | |
| 2012/0018999 A1 * | 1/2012 | Geese | F16L 21/065 285/337 |
| 2016/0053661 A1 * | 2/2016 | Freeman | F01N 13/14 60/301 |
| 2019/0078476 A1 * | 3/2019 | Kishikawa | F01N 13/141 |
| 2019/0135201 A1 * | 5/2019 | Herzig | F01N 13/14 |

FOREIGN PATENT DOCUMENTS

| | | | |
|---|---|---|---|
| DE | 102007041567 a1 * | 3/2009 | F01N 13/14 |
| EP | 0455061 A1 * | 11/1991 | F01N 13/14 |
| EP | 974011 A1 | 3/2002 | |
| EP | 1213453 A1 | 6/2002 | |
| EP | 2261475 A1 | 12/2010 | |
| EP | 2385228 A2 | 11/2011 | |
| EP | 2546489 A1 | 1/2013 | |
| EP | 2664761 A1 | 2/2013 | |
| EP | 2568140 A1 | 3/2013 | |
| JP | 58098621 A * | 6/1983 | F01N 13/14 |
| JP | S5953230 A | 3/1984 | |
| JP | 2008267259 A | 11/2008 | |

* cited by examiner

EXHAUST SHIELD ASSEMBLY

BACKGROUND

The present invention relates to exhaust shields, and more particularly to an exhaust shield mount for a motorcycle.

Exhaust pipes or exhaust headers are used to transport exhaust from the engine of a vehicle. Exhaust gas flowing through the headers is hot and increases the temperature of the headers from an ambient temperature to an operation temperature, which may be several hundred degrees Fahrenheit above ambient. A shield may be mounted to the exhaust pipes to cover the exhaust pipes to prevent them from being directly exposed.

SUMMARY

In one aspect, the invention provides an exhaust assembly for a vehicle. The exhaust assembly includes a header assembly including one or more head pipes, and a bridge with a first end and a second end that is opposite the first end. The first and second ends are secured to the header assembly. The exhaust assembly further includes a shield assembly including a shield shaped to cover a portion of the header assembly. A retainer is secured to the shield and supported by the bridge by a planar clamp joint therebetween.

In another aspect, the invention provides an exhaust assembly for a vehicle. The exhaust assembly includes an exhaust pipe, a stay fixed to the exhaust pipe, and a shield retained on the exhaust pipe by a joint formed between a retainer of the shield and the stay. The joint provides the retainer with three degrees of freedom relative to the stay.

In another aspect, the invention provides an exhaust pipe shield assembly including a retainer with a first band and a second band coupled to the first band to define a slit therebetween and a shield with an outer periphery that defines a concavity. The shield is configured to cover an exhaust pipe that is at least partially positioned within the concavity. The exhaust pipe assembly also includes a fastener arranged to extend through the retainer such that tightening of the fastener provides a clamping force between the first and second bands of the retainer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The term "laterally" or variations thereof refer to a sideways direction. The terms "top," "upper," "bottom," and "lower" are intended to indicate directions when viewing a vehicle when positioned for use. The term "coupled" means connected to or engage with, whether either directly or indirectly, for example with an intervening member, and does not require the engagement to be fixed or permanent, although engagement can be fixed or permanent. It should be understood that the use of numerical terms "first," "second," "third," etc. as used herein does not refer to any particular sequence or order of components; for example, "first" and "second" portions may refer to any sequence of such components, and is not limited to the first and second components of a particular configuration.

Figure 1:
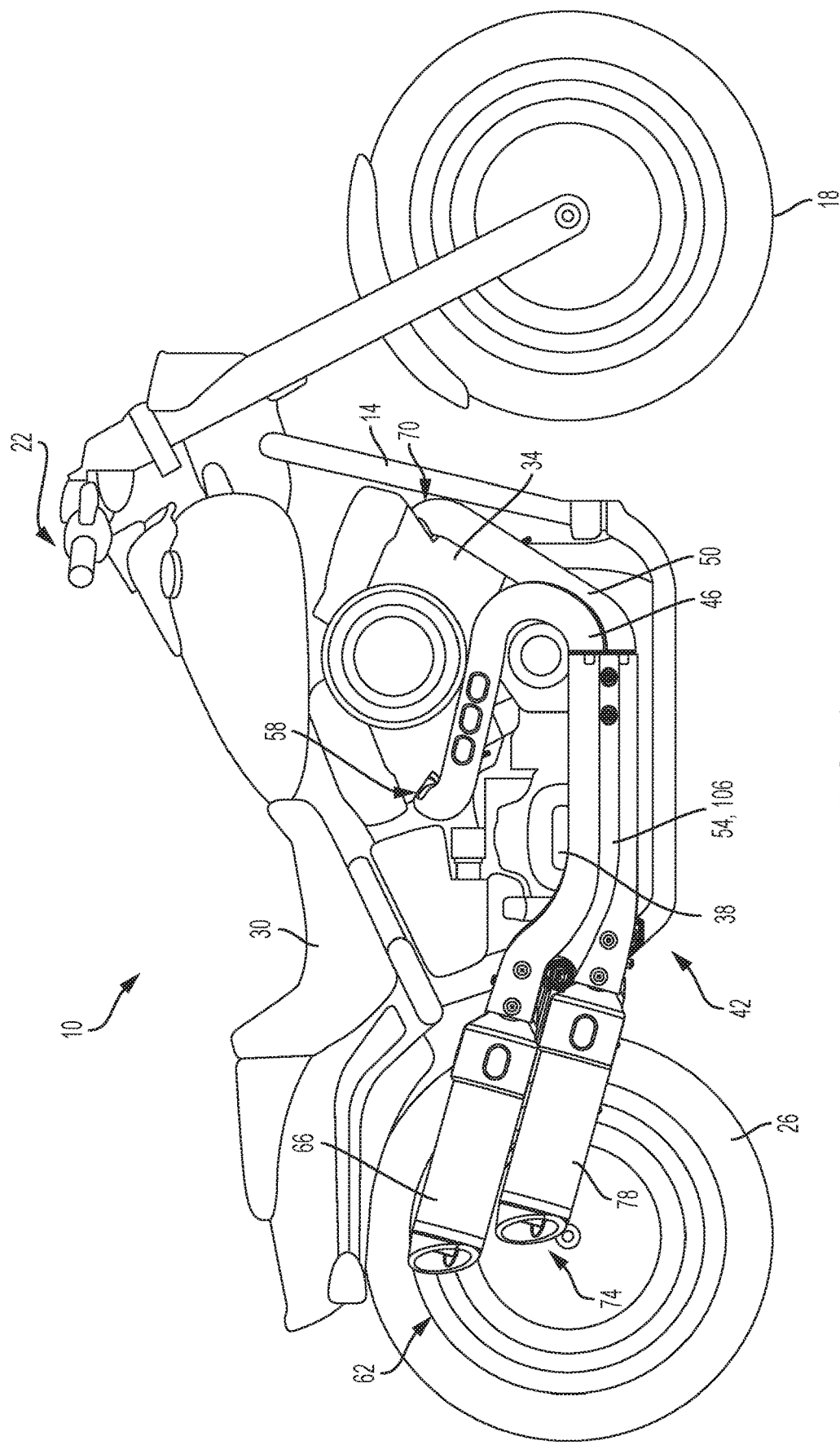
FIG. 1 is a side view of a motorcycle.

FIG. 1 illustrates a motorcycle 10. The illustrated motorcycle 10 includes a frame 14, a front wheel 18 coupled to the frame 14 through a steering assembly 22, a rear wheel 26 coupled to the frame 14 through a swing arm assembly (not shown), and a seat 30 for a rider to be positioned. The motorcycle 10 includes an engine 34 coupled to the frame 14 and operatively coupled to the rear wheel 26 through a transmission 38.

Figure 2:
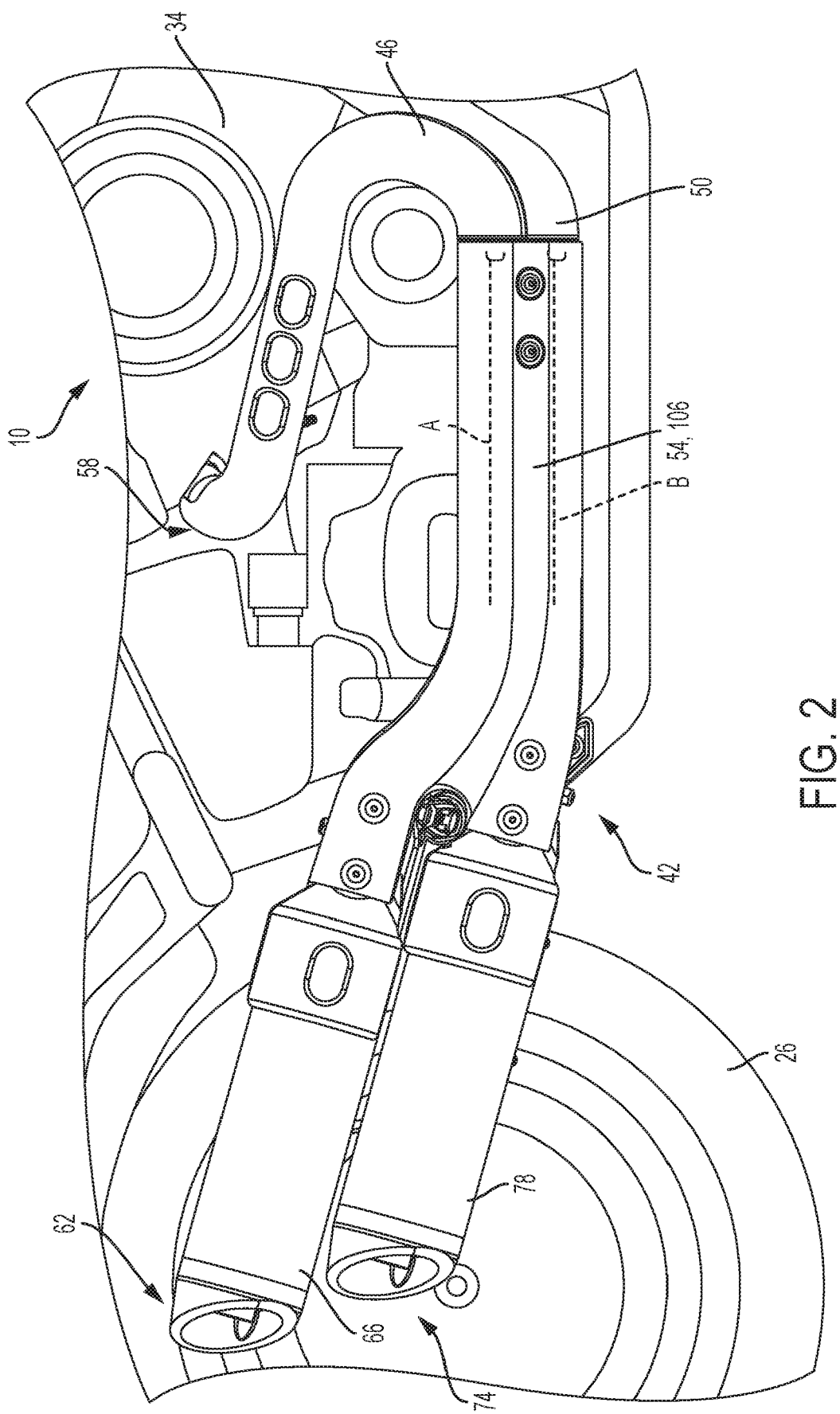
FIG. 2 is a side view of the motorcycle shown in FIG. 1 detailing an exhaust assembly.

With reference to FIGS. 1 and 2, the motorcycle 10 further includes an exhaust assembly 42 that transports exhaust gas from the engine 34. Although the exhaust assembly 42 is illustrated on a motorcycle, the exhaust assembly 42 may be used on other rider-type vehicles such as ATVs, mopeds, motocross bikes, or the like. In other embodiments, the exhaust assembly 42 may be used on four wheel vehicles such as cars, trucks, or the like.

Figure 3:
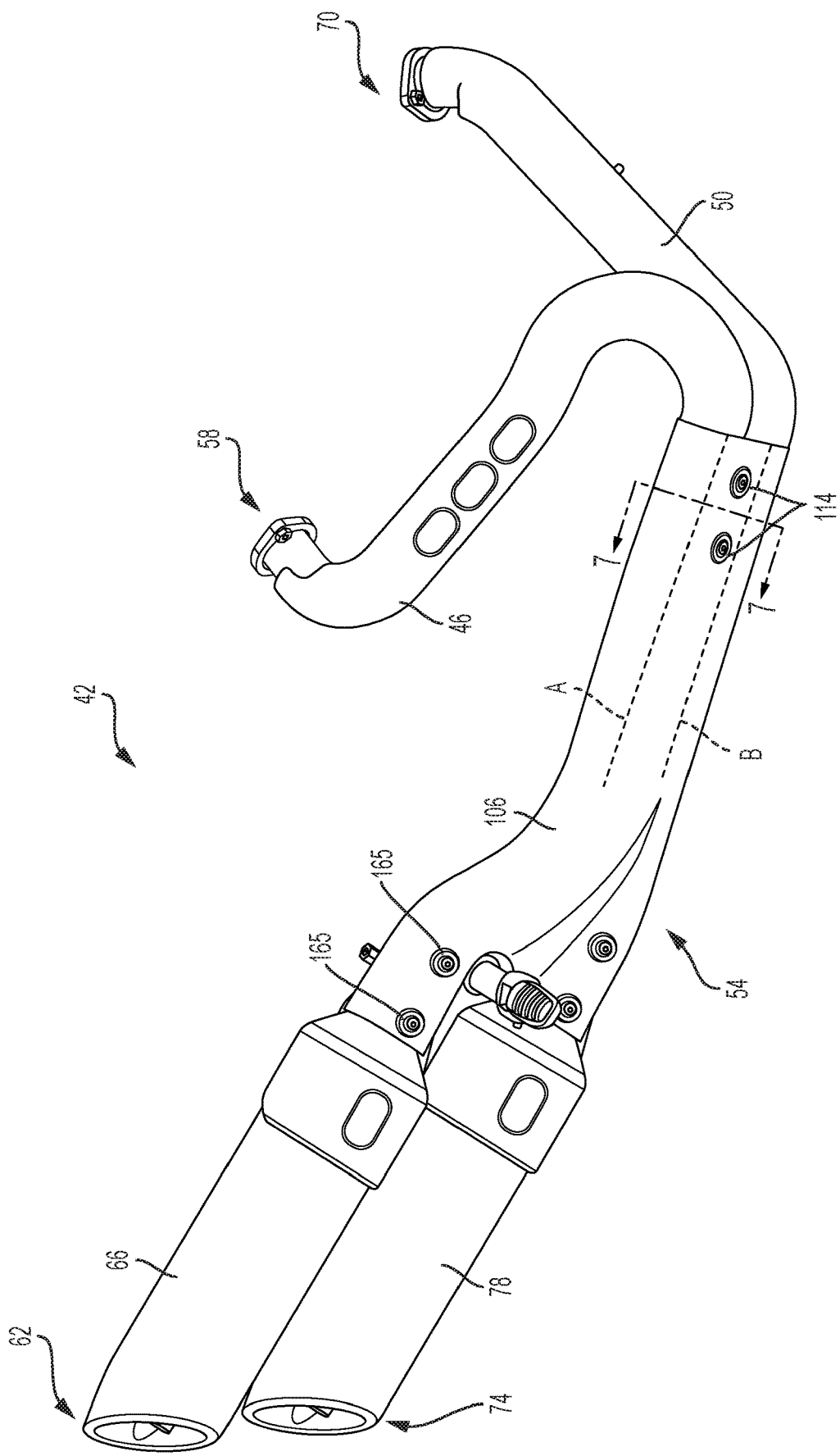
FIG. 3 is a perspective view of the exhaust assembly of FIG. 2.
Figure 7:
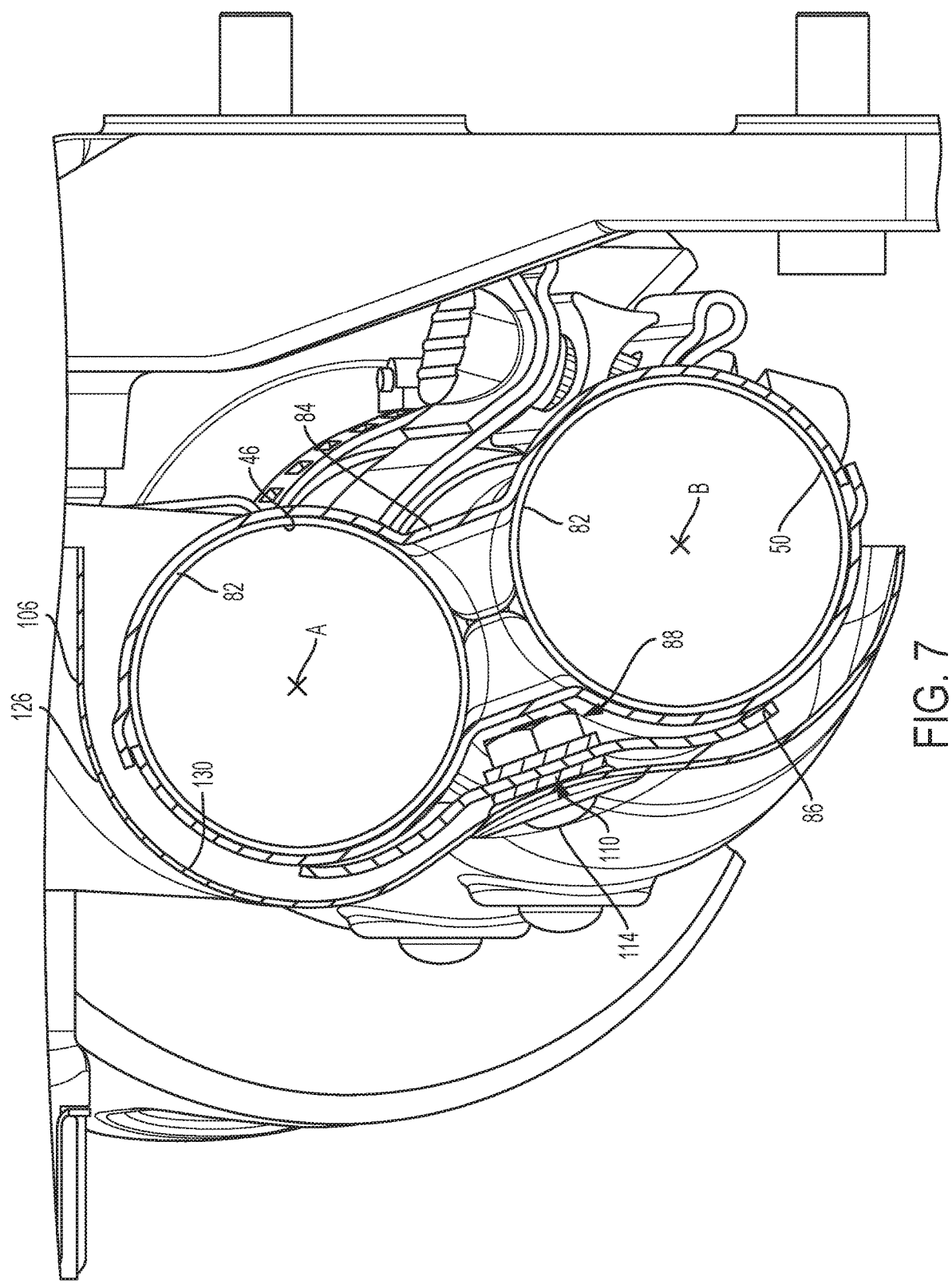
FIG. 7 is a cross-sectional view of the exhaust assembly of FIG. 3 taken along lines 7-7.

Now referencing FIG. 3, the exhaust assembly 42 includes a header assembly and a shield assembly 54 (e.g., a header shield assembly). The header assembly can include one or more exhaust pipes that transmit exhaust gas from the engine 34 to one or more mufflers 66, 78 that define a downstream end of the exhaust assembly 42. As illustrated, the header assembly 42 includes a first head pipe or header 46 having an inlet end 58 that is coupled to a first exhaust port (not shown) on the engine 34 to form a first inlet of the exhaust assembly 42. Similarly, a second head pipe or header 50 includes an inlet end 70 that is coupled to a second exhaust port (not shown) of the engine 34 to form a second inlet of the exhaust assembly 42. Thus, the headers 46, 50 are coupled to the engine 34 to receive exhaust directly therefrom, and as such, are subjected to the most extreme heating effect of any portion of the overall exhaust assembly 42. The exhaust assembly 42 includes corresponding outlets 62, 74 opposite the header inlet ends 58, 70. The outlets 62, 74 are provided by a first muffler 66 and a second muffler 78, respectively. In the illustrated embodiment, the headers 46, 50 are shown to include shields or covers at least partially surrounding respective pipe conduits thereof. Each of the first and second headers 46, 50 has a generally circular cross-section shape that defines a passage 82 (FIG. 7). The passages 82 define respective central axes A, B of each header 46, 50. The headers 46, 50 and the axes A, B thereof are parallel to each other at the downstream ends of the headers 46, 50. A shell or collector 84 (FIG. 7) is coupled to and partially retains the downstream ends of the first and second headers 46, 50 from moving relative to each other. In other words, the collector 84 limits the distance the first header 46 is allowed to move relative to the second header 50. The collector 84 is an exhaust pipe that receives the exhaust flow from both headers 46, 50 for mixing thereof. One or more catalysts (FIG. 5) may also be positioned downstream of the collector 84. In the illustrated embodiment, the collector 84 is constructed from two shell pieces. In other embodiments, the collector may be constructed from one continuous piece. Exhaust gas from the engine 34 enters the passages 82 of the headers 46, 50 through the inlet ends 58, 70 and exits the headers 46, 50 into the collector 84 before passing through additional pipes of the header assembly to the respective mufflers 66, 78 and being discharged at the outlet ends 62, 74. In some embodiments, the headers 46, 50 may be integrally formed with the collector 84 to create jointless exhaust conduits that extend from the inlet ends 58, 70 to the outlets 62, 74. In further embodiments, the headers 46, 50 include the pipes upstream of the collector 84 and downstream of the collector 84 before the mufflers 66, 78. The collector 84, along with additional downstream pipes of the header assembly can extend parallel to or in line with the axes A, B. For example, the collector 84 may have two convex contoured portions that follow the axes A, B defined by the headers 46, 50. In the illustrated embodiment, the exhaust pipes upstream of the mufflers 66, 78, including the first and second headers 46, 50 and the collector 84, are constructed from austenitic stainless steel that has a coefficient of thermal expansion within a range from 9.6 to 10.4 $\mu$in/(in-deg.F). In other embodiments, the exhaust pipes upstream of the mufflers 66, 78 may be made from an alternate material having a coefficient of thermal expansion above or below the above identified range.

Figure 5:
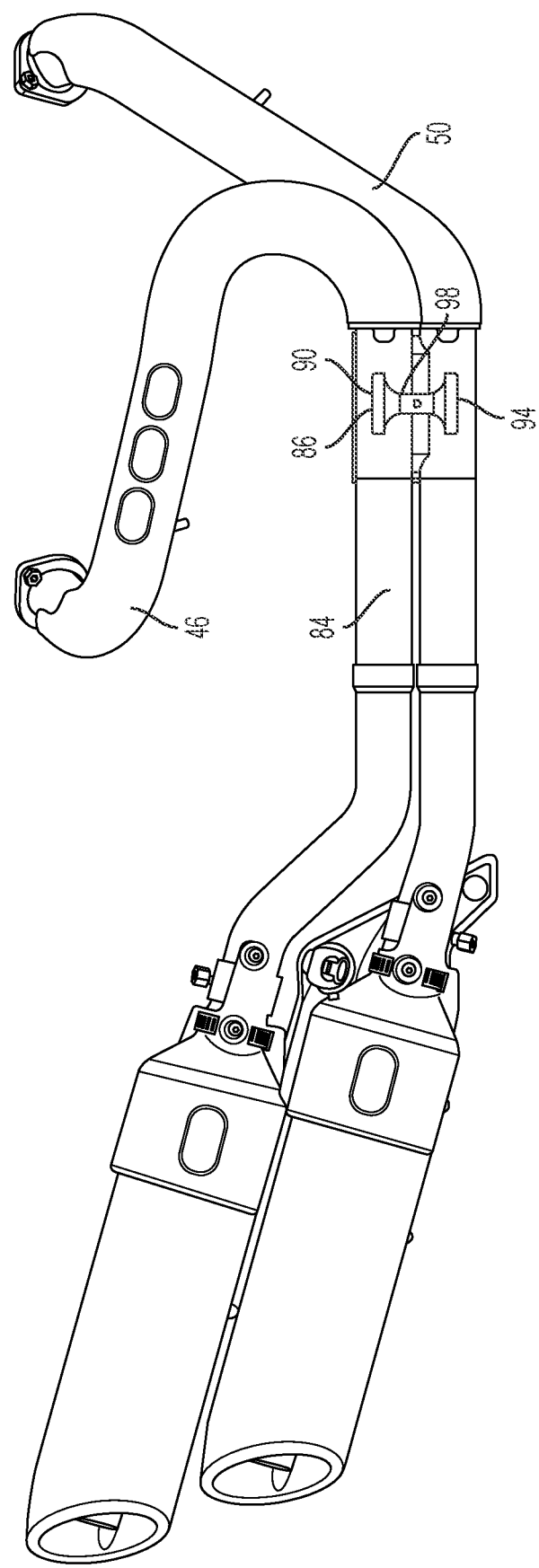
FIG. 5 is a side view of the exhaust assembly of FIG. 3 detailing a bridge.

As illustrated in FIG. 5, a bridge 86 spans a space 88 (FIG. 7) formed between the two convex contoured portions of the collector 84. The bridge 86 includes a first end 90 that is coupled to the header assembly proximate the first axis A in side view, a second end 94 opposite the first end 90 that is coupled to the header assembly proximate the second axis B in side view, and a mid-section 98 therebetween. In the illustrated embodiment, the first and second ends 90, 94 of the bridge 86 are welded to the header assembly. In other embodiments, the bridge 86 may be fixed to the header assembly in other ways such as, for example, using fasteners or an adhesive. The mid-section 98 has a reduced width between the first and second ends 90, 94. However, the mid-section 98 can have a width that is reduced more or less than shown, or may not be reduced at all. The bridge 86 is constructed from a flat sheet of material (e.g., metal), although the bridge can be constructed from other materials. The bridge 86 is one example of a shield stay, which may be fixedly secured to a header assembly having one or more headers. Thus, the bridge 86 may form part of the header assembly.

Figure 4:
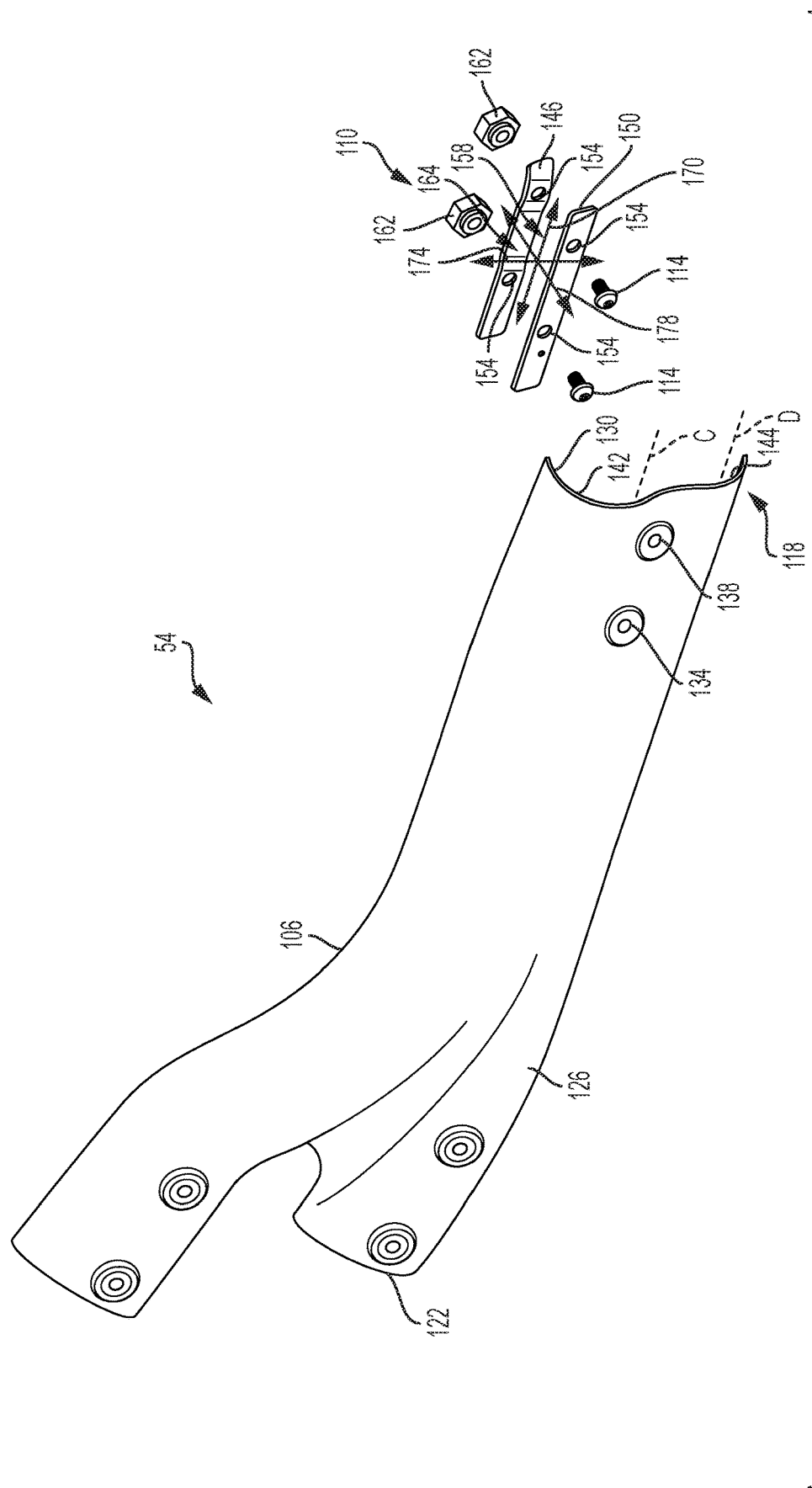
FIG. 4 is an exploded view of a shield assembly of the exhaust assembly of FIG. 3.

With reference to FIG. 4, the shield assembly 54 includes an exhaust shield 106, a retainer 110, and fasteners 114. The shield 106 includes a front end 118, a rear end 122 opposite the front end 118, a first or exterior side 126 facing away from the motorcycle 10 when positioned for use, and a second or interior side 130 opposite the first side 126. The shield 106 further includes first and second apertures 134, 138 adjacent the front end 118 that extend through the shield 106 between the first and second sides 126, 130. The shield 106 defines first and second concavities 142, 144 on the second side 130 in which convex portions of the collector 84 are positioned, respectively, to cover at least a portion of the header assembly. The first and second concavities 142, 144 define axes C, D that are aligned with the axes A, B defined by the headers 46, 50 at their downstream ends. The shield 106, in some constructions, is constructed from carbon steel which has a coefficient of thermal expansion within a range from 6.8 to 7.9 $\mu$in/(in-deg.F). As such, the shield 106 has a coefficient of thermal expansion that is less than the coefficient of thermal expansion of the pipes of the header assembly, including the headers 46, 50. In other embodiments, the shield 106 may be constructed from an alternate material having a coefficient of thermal expansion above or below the above identified range.

With continued reference to FIG. 4, the retainer 110 includes a first band 146 and a second band 150. Each of the first and second bands 146, 150 includes two apertures 154 that, when assembled, align with the first and second apertures 134, 138 of the shield 106. When assembled, the first and second bands 146, 150 define a slit 158 in which the mid-section 98 of the bridge 86 is positioned. The fasteners 114 extend through the first and second apertures 134, 138 of the header shield 106 and the apertures 154 of the first and second bands 146, 150 and are secured in place with nuts 162. As the fasteners 114 are tightened, the slit 158 begins to close, creating a clamping force on an object (e.g., the bridge 86, as discussed in more detail below) positioned between the first and second bands 146, 150. In the illustrated construction, one of the bands 146, 150 (e.g., the first band 146) is formed with a recess or pocket 164 that accommodates the thickness of the bridge 86, and the clamping force is set by tightening the fasteners 114 (e.g., to fully close the slit 158 such that the bands 146, 150 are in contact with each other at the locations of the fasteners 114). In other constructions, the slit 158 may be closed by a single fastener or more than two fasteners. Although not required in all constructions, the first and second bands 146, 150 may be integrally formed or fixedly secured together at one end (e.g., left side in FIG. 4), for example by spot welding, to form a closed end of the slit 158. The opposite end of the slit 158, as shown on the right of FIG. 4, may be formed with a lead-in feature or guide that expands toward an open end of the slit 158 so as to assist with guiding the entry of the bridge 86 into the slit 158. In the illustrated construction, such a feature is provided on the first band 146 by a bend formed in a direction away from the second band 150.

To assemble the shield 106 so that it covers the headers 46, 50, the retainer 110 is assembled to the header assembly via engagement with the bridge 86. In the illustrated construction, this involves positioning the retainer 110 in the space 88 and sliding the retainer 110 onto the bridge 86 so that the bridge 86 is received in the slit 158. As such, the first band 146 is on a first side of the bridge 86, toward the headers 46, 50, and the second band 150 is on an opposite side of the bridge 86 so that the shield 106, with its second side 130, can be positioned against the second band 150 with the apertures 134, 138, 154 aligned. The shield 106 is then positioned on the header assembly so that the collector 84 and/or other exhaust pipes of the header assembly are positioned within the concavities 142, 144. In the illustrated construction, the shield 106 extends from the downstream ends of the headers 46, 50 to the upstream ends of the mufflers 66, 78. Prior to assembly, nuts 164 are coupled (i.e., projection welded) to the first band 146 over the apertures 154. Then, the fasteners 114 are positioned in the first and second apertures 134, 138 of the shield 106 and positioned in the apertures 154 of the second band 150. Finally, the fasteners 114 are positioned in the apertures 154 of the first band 146 and threaded to the nuts 164 to secure the mid-section 98 of the bridge 86 within the slit 158 of the retainer 110 and thus the shield 106 to the exhaust assembly 42. In the illustrated embodiment, additional fasteners 165 (FIG. 3) may be used to secure the shield 106 to the header assembly. The fasteners 165 couple a downstream end of the shield 106 to the header assembly. The downstream end of the shield 106 may be coupled to the mufflers 66, 78, additional shields (e.g., muffler shields or the like), or to pipes downstream of the collector 84 with the fasteners 165. In some embodiments, the additional fasteners 165 may be used with a retainer similar to the retainer 110. It is also noted that the retainer 110 may be formed as part of the shield 106 in some constructions. For example, the second band 150 may be fixedly secured (e.g., by welding) to the second side 130 of the shield 106, or the shield 106 may constitute the second band 150 such that its second side 130 cooperates with the first band 146 to form the slit 158. Although it may be desirable to form the shield 106 with the apertures 134, 138 so that the fasteners 114 are exposed, it is also conceived that the fasteners 114 may be hidden from the exterior side 126 of the shield 106, for example by integrating threaded studs or nuts into the second side 130 of the shield 106.

Figure 6:
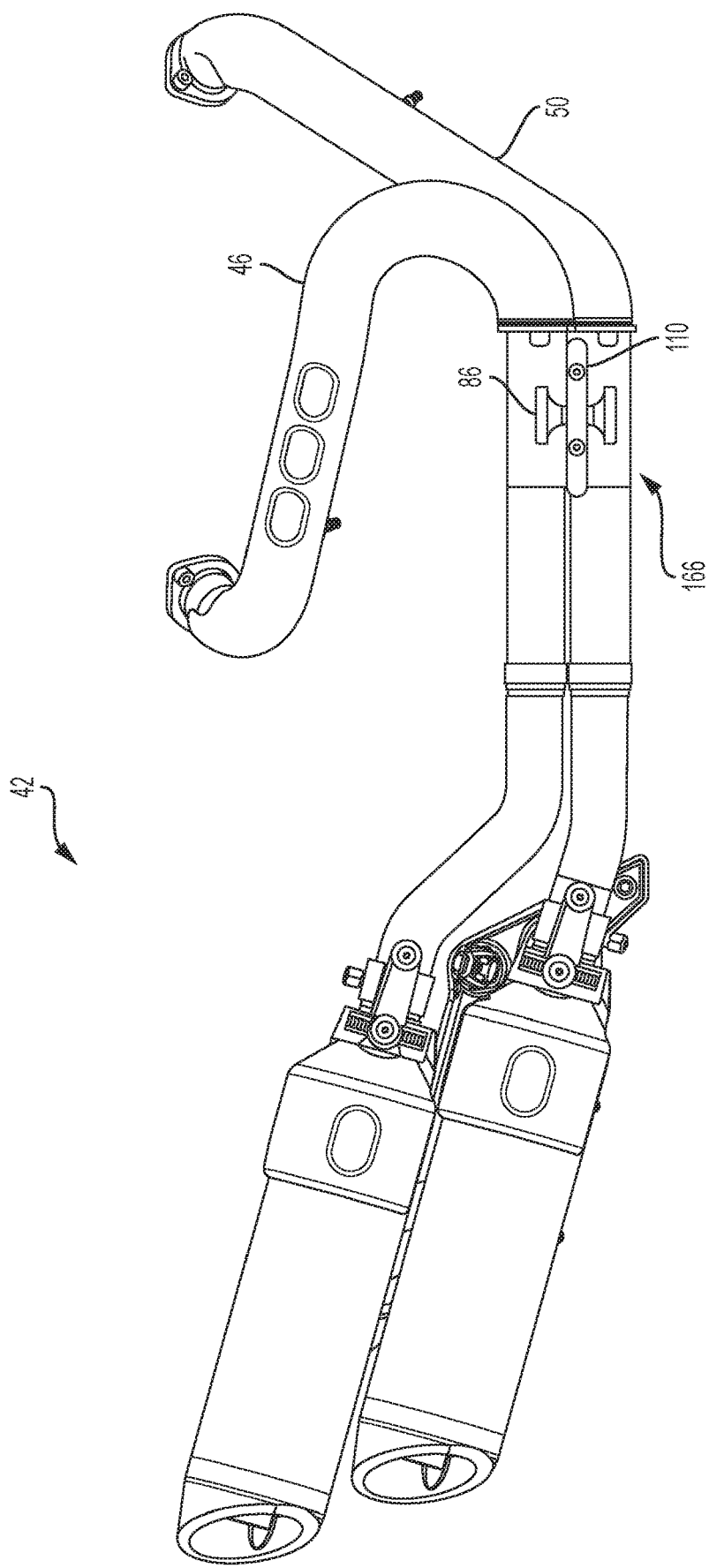
FIG. 6 is a perspective view of the exhaust assembly of FIG. 3 detailing a retainer of the shield.

With reference to FIG. 6, when the shield assembly 54 is positioned on the header assembly, the retainer 110 and the bridge 86 form a planar clamp joint 166. The planar clamp joint 166 supports the retainer 110 on the bridge 86 with friction caused by the clamping force between the first and second bands 146, 150, and particularly, the planar surfaces of the bridge 86 are clamped by the planar surfaces of the first and second bands 146, 150. In one exemplary embodiment, a force between 30 and 50 pounds is required to overcome the friction generated by the clamping force and move the retainer 110 relative to the bridge 86. However, if the friction is overcome, due to the slit 158, the planar clamp joint 166 provides the retainer 110 and thus the shield 106 with three degrees of freedom to move relative to the bridge 86 and thus the header assembly. As described below, this limits the potential for stress build-up in the joint 166.

As shown in FIG. 3, the first degree of freedom is a translation degree of freedom along a first axis 170 that is parallel with the axes A, B, the second degree of freedom is a translation degree of freedom along a second axis 174 that is perpendicular to the first axis 170, and the third degree of freedom is a rotational degree of freedom that is about a third axis 178 that is perpendicular to both the first and second axes 170, 174. As such, within a certain range of travel, the retainer 110 may traverse along the first and second axes 170, 174 and rotate about the third axis 178 relative to the bridge 86. Inversely, the clamp joint 166 prevents rotation of the retainer 110 relative to the bridge 86 about the first and second axes 170, 174 and prevents the retainer 110 from traversing along the third axis 178 relative to the bridge 86.

During operation of the motorcycle 10, exhaust gas exits the engine 34 into the headers 46, 50. Due to the high temperatures of the exhaust gas, the pipes of the header assembly including the headers 46, 50 expand. Heating may also cause the shield 106 expand. However, due to the pipes of the header assembly having a higher coefficient of thermal expansion than the shield 106 and experiencing higher temperatures, the pipes of the header assembly including the headers 46, 50 expand more than the shield 106 which causes the pipes of the header assembly to apply a thermally induced load to the shield 106. The thermally induced load is applied through the clamp joint 166. Once the thermally induced load exceeds a threshold limit on the clamp joint 166, it overcomes the friction and allows slip between the retainer 110 and the bridge 86. Allowing the retainer 110 to move relative to the bridge 86 within three degrees of freedom reduces the amount of stress the joint 166 experiences and prevents fatigue failure of the shield assembly 54.

In addition, preventing rotation of the retainer 110 relative to the bridge 86 about the first and second axes 170, 174 and preventing the retainer 110 from traversing along the third axis 178 relative to the bridge 86 allows the shield 106 to cover the headers 46, 50 without the creation of buzz, squeak, and rattle ("BSR") noises.

Various features and advantages of the invention are set forth in the following claims.

What is claimed is:

1. An exhaust pipe shield assembly comprising:
   a retainer including a first band and a second band coupled to the first band to define a slit therebetween;
   a shield with an outer periphery that defines a first concavity and a second concavity adjacent the first concavity, the shield configured to cover an exhaust pipe that is at least partially positioned within at least one of the first concavity and the second concavity; and
   a fastener arranged to extend through the retainer such that tightening of the fastener provides a clamping force between the first and second bands of the retainer.

2. The exhaust pipe shield assembly of claim 1, wherein movement of the retainer allows three degrees of freedom relative to an exhaust pipe, the three degrees of freedom including:
   a first degree of freedom being a translation degree of freedom along a first axis, a second degree of freedom being a translation degree of freedom along a second axis that is perpendicular to the first axis, and a third degree of freedom being a rotational degree of freedom about a third axis that is perpendicular to both the first and second axes.

3. The exhaust pipe shield assembly of claim 2, wherein the first concavity defines a fourth axis and the second concavity defines a fifth axis, and wherein the fourth and fifth axes are parallel to the first axis.

4. An exhaust assembly for a vehicle, the exhaust assembly comprising:
   a header assembly including one or more head pipes;
   a bridge including a first end and a second end opposite the first end, the first and second ends secured to the header assembly; and
   a shield assembly including
      a shield shaped to cover a portion of the header assembly, and
      a retainer secured to the shield and supported by the bridge by a planar clamp joint therebetween;
   wherein the first end of the bridge is welded to a first convex contoured portion of the header assembly and the second end of the bridge is welded to a second convex contoured portion of the header assembly such that a mid-section of the bridge spans a space therebetween.

5. An exhaust assembly for a vehicle, the exhaust assembly comprising:
   a header assembly including one or more head pipes;
   a bridge including a first end and a second end opposite the first end, the first and second ends secured to the header assembly; and
   a shield assembly including
      a shield shaped to cover a portion of the header assembly, and
      a retainer secured to the shield and supported by the bridge by a planar clamp joint therebetween;
   wherein the retainer includes a first band and a second band coupled together to define a slit therebetween; and
   wherein the bridge is positioned within the slit of the retainer.

6. An exhaust assembly for a vehicle, the exhaust assembly comprising:
   an exhaust pipe;
   a stay fixed to the exhaust pipe; and
   a shield retained on the exhaust pipe by a joint formed between a retainer of the shield and the stay, the joint providing the retainer with three degrees of freedom relative to the stay, the three degrees of freedom including:
   a first degree of freedom being a translation degree of freedom along a first axis, a second degree of freedom being a translation degree of freedom along a second axis that is perpendicular to the first axis, and a third degree of freedom being a rotational degree of freedom about a third axis that is perpendicular to both the first and second axes.

7. The exhaust assembly of claim 6, wherein the joint is a planar clamp joint that secures the retainer to the stay in friction.

8. The exhaust assembly of claim 7, wherein movement of the retainer within the three degrees of freedom avoids thermal expansion stressing of the planar clamp joint between the shield and the stay.

9. The exhaust assembly of claim 6, wherein the retainer includes at least one fastener that clamps the retainer around the stay to secure the shield to the exhaust pipe.

10. The exhaust assembly of claim 6, wherein the stay is a flat sheet.

11. The exhaust assembly of claim 6, wherein the shield is constructed of a material with a lower coefficient of thermal expansion than that of a material from which the exhaust pipe is constructed.

12. The exhaust assembly of claim 6, wherein the first axis is parallel to an axis of the exhaust pipe.

13. An exhaust assembly for a vehicle, the exhaust assembly comprising:
   a header assembly including one or more head pipes;
   a bridge including a first end and a second end opposite the first end, the first and second ends secured to the header assembly; and
   a shield assembly including
      a shield shaped to cover a portion of the header assembly, and
      a retainer secured to the shield and supported by the bridge by a planar clamp joint therebetween;
   wherein the planar clamp joint provides the retainer with three degrees of freedom relative to the bridge including:
      a first degree of freedom being a translation degree of freedom along a first axis, a second degree of freedom being a translation degree of freedom along a second axis that is perpendicular to the first axis, and a third degree of freedom being a rotational degree of freedom about a third axis that is perpendicular to both the first and second axes.

14. The exhaust assembly of claim 13, wherein the planar clamp joint provides friction between the retainer and the bridge.

15. The exhaust assembly of claim 14, wherein movements of the retainer within the three degrees of freedom avoids thermal expansion stressing of the planar clamp joint between the bridge and the retainer.

16. The exhaust assembly of claim 13, wherein the first end of the bridge is welded to a first convex contoured portion of the header assembly and the second end of the bridge is welded to a second convex contoured portion of the header assembly such that a mid-section of the bridge spans a space therebetween.

17. The exhaust assembly of claim 16, wherein the retainer is supported by the mid-section of the bridge.

18. The exhaust assembly of claim 17, wherein the retainer is supported by the mid-section of the bridge with fasteners.

19. The exhaust assembly of claim 13, wherein the retainer includes a first band and a second band coupled together to define a slit therebetween.

20. The exhaust assembly of claim 19, wherein the bridge is positioned within the slit of the retainer.

21. The exhaust assembly of claim 13, wherein the shield is constructed of a material with a lower coefficient of thermal expansion than that of a material from which the one or more head pipes of the header assembly is constructed.

22. The exhaust assembly of claim 13, wherein the shield assembly further includes at least one fastener that clamps the retainer to the bridge to define the planar clamp joint.

23. The exhaust assembly of claim 13, wherein the first axis is parallel to an axis of the header assembly.

* * * * *